US008713114B2

(12) United States Patent
Crawford

(10) Patent No.: US 8,713,114 B2
(45) Date of Patent: Apr. 29, 2014

(54) DIRECT FILE TRANSFER BETWEEN SUBSCRIBERS OF A COMMUNICATIONS SYSTEMS

(75) Inventor: James Crawford, Belmont, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/154,328

(22) Filed: Jun. 6, 2011

(65) Prior Publication Data

US 2011/0258273 A1 Oct. 20, 2011

Related U.S. Application Data

(63) Continuation of application No. 12/110,996, filed on Apr. 28, 2008, now Pat. No. 7,958,243, which is a continuation of application No. 09/597,784, filed on Jun. 19, 2000, now Pat. No. 7,366,779.

(51) Int. Cl.
*G06F 15/16* (2006.01)
*H04L 12/58* (2006.01)
*H04L 29/08* (2006.01)

(52) U.S. Cl.
CPC .............. *H04L 51/04* (2013.01); *H04L 12/581* (2013.01); *H04L 67/06* (2013.01)
USPC .......................................... 709/206; 706/207

(58) Field of Classification Search
CPC ....... H04L 67/06; H04L 51/04; H04L 12/581; H04L 12/589
USPC ................................................. 709/206, 207
See application file for complete search history.

(56) References Cited

U.S. PATENT DOCUMENTS

| 5,327,486 A | 7/1994 | Wolff et al. |
| 5,533,110 A | 7/1996 | Pinard et al. |
| 5,544,322 A | 8/1996 | Cheng et al. |
| 5,557,659 A | 9/1996 | Hyde-Thomson |
| 5,608,786 A | 3/1997 | Gordon |

(Continued)

FOREIGN PATENT DOCUMENTS

| EP | 695997 | 2/1996 |
| EP | 864959 | 9/1998 |

(Continued)

OTHER PUBLICATIONS

"AOL Instant Messenger Windows Beta Features," Jun. 24, 1999; 2 pages; AOL Instant Messenger All New Version 2.0, 2 pages; Jun. 24, 1999; What is AOL Instant Messenger; 3 pages; Jun. 24, 1999; Quick Tips for Getting Started; 5 pages; Jun. 24, 1999; Frequently Asked Questions About AOL Instant Messenger; 6 pages; Jun. 24, 1999.

(Continued)

*Primary Examiner* — Kristie Shingles
(74) *Attorney, Agent, or Firm* — Keller Jolley Preece

(57) ABSTRACT

Systems and techniques for transferring a file from a first client associated with a first subscriber to a communications system to a second client associated with a second subscriber to the communications system by connecting from the first client to a communications system host; sending, through the communications system host, a request to the second client to establish a direct connection to the second client; when the second client accepts the request, establishing a direct connection to the second client that bypasses the communications system host; and transferring a file over the direct connection.

27 Claims, 15 Drawing Sheets

(56) References Cited

U.S. PATENT DOCUMENTS

| | | | |
|---|---|---|---|
| 5,610,910 A | | 3/1997 | Focsaneanu et al. |
| 5,742,905 A | | 4/1998 | Pepe et al. |
| 5,761,421 A | * | 6/1998 | van Hoff et al. ............ 709/223 |
| 5,764,916 A | | 6/1998 | Busey et al. |
| 5,793,365 A | | 8/1998 | Tang et al. |
| 5,857,189 A | | 1/1999 | Riddle |
| 5,870,552 A | | 2/1999 | Dozier et al. |
| 5,920,692 A | | 7/1999 | Nguyen et al. |
| 5,951,646 A | | 9/1999 | Brandon |
| 5,960,411 A | | 9/1999 | Hartman et al. |
| 5,999,965 A | | 12/1999 | Kelly |
| 6,026,429 A | | 2/2000 | Jones et al. |
| 6,212,548 B1 | | 4/2001 | DeSimone et al. |
| 6,233,577 B1 | | 5/2001 | Ramasubramani et al. |
| 6,253,202 B1 | | 6/2001 | Gilmour |
| 6,275,490 B1 | | 8/2001 | Mattaway et al. |
| 6,347,085 B2 | | 2/2002 | Kelly |
| 6,359,892 B1 | | 3/2002 | Szlam |
| 6,442,571 B1 | | 8/2002 | Haff et al. |
| 6,449,344 B1 | | 9/2002 | Goldfinger et al. |
| 6,457,130 B2 | | 9/2002 | Hitz et al. |
| 6,458,130 B1 | | 10/2002 | Frazier et al. |
| 6,466,968 B2 | | 10/2002 | Shirai et al. |
| 6,513,066 B1 | * | 1/2003 | Hutton et al. .............. 709/227 |
| 6,574,452 B1 | | 6/2003 | Morvan et al. |
| 6,631,416 B2 | | 10/2003 | Bendinelli et al. |
| 6,640,241 B1 | | 10/2003 | Ozzie et al. |
| 6,654,790 B2 | * | 11/2003 | Ogle et al. .................. 709/206 |
| 6,678,341 B1 | | 1/2004 | Miyake et al. |
| 6,704,282 B1 | | 3/2004 | Sun et al. |
| 6,742,023 B1 | | 5/2004 | Fanning et al. |
| 6,816,904 B1 | | 11/2004 | Ludwig et al. |
| 6,820,204 B1 | | 11/2004 | Desai et al. |
| 6,907,463 B1 | * | 6/2005 | Kleinpeter, III et al. ...... 709/228 |
| 6,965,868 B1 | * | 11/2005 | Bednarek .................... 705/7.14 |
| 7,003,546 B1 | | 2/2006 | Cheah et al. |
| 7,023,855 B2 | | 4/2006 | Haumont et al. |
| 7,185,285 B2 | | 2/2007 | Van Dok et al. |
| 7,240,214 B2 | * | 7/2007 | Gazzetta et al. ............ 713/182 |
| 7,366,779 B1 | | 4/2008 | Crawford |
| 7,502,831 B1 | | 3/2009 | Macias et al. |
| 7,546,254 B2 | * | 6/2009 | Bednarek .................... 705/26.1 |
| 7,546,337 B1 | * | 6/2009 | Crawford ..................... 709/203 |
| 7,734,702 B2 | | 6/2010 | Kim |
| 7,958,243 B2 | | 6/2011 | Crawford |
| 8,010,680 B2 | | 8/2011 | Crawford |
| 8,185,635 B2 | | 5/2012 | Holmes et al. |
| 8,417,784 B2 | | 4/2013 | Mandre |
| 2001/0007128 A1 | | 7/2001 | Lambert et al. |
| 2002/0065894 A1 | * | 5/2002 | Dalal et al. .................. 709/206 |
| 2002/0097709 A1 | | 7/2002 | Haumont et al. |
| 2004/0148346 A1 | | 7/2004 | Weaver et al. |
| 2004/0193722 A1 | | 9/2004 | Donovan |
| 2008/0263149 A1 | | 10/2008 | Crawford |
| 2011/0314117 A1 | | 12/2011 | Crawford |
| 2013/0073677 A1 | | 3/2013 | Crawford |
| 2013/0073678 A1 | | 3/2013 | Crawford |
| 2013/0173724 A1 | | 7/2013 | Crawford |

FOREIGN PATENT DOCUMENTS

| | | |
|---|---|---|
| WO | WO 97/14234 | 4/1997 |
| WO | WO 98/16045 | 4/1998 |
| WO | WO 01/84799 | 11/2001 |

OTHER PUBLICATIONS

"AOL technology: turning complicated things into engaging services;" 1996 Annual Report; 22 pages.

"Napster plays dodgeball with music biz;" Robert Lemos; ZDNet News; Aug. 13, 1999.

"The case for services over cascaded networks," Anthony D. Joseph, B.R. Badrinath, Randy H. Katz; International Workshop on Wireless Mobile Multmedia; pp. 2-10; ISBN: 1-58113-093-7.

"YAHOO! Messenger Makes the World a Little Smaller, More Informed;" pp. 1-2, Jun. 21, 1999.

Alan Cohen, "Instant Messaging;" Apr. 13, 1999; PC Magazine; PC Labs; 2 pages.

Office Action issued in U.S. Appl. No. 09/572,953, mailed Oct. 8, 2003.

Office Action issued in U.S. App. No. 09/572,953, mailed May 5, 2004.

Office Action issued in U.S. Appl. No. 09/572,953, mailed May 3, 2007.

Mike Snider, "America goes online for New Year's bash;" Jan. 3, 2000; USA Today; 1 page.

U.S. Appl. No. 09/572,953, mailed Dec. 31, 2007, Office Action.

U.S. Appl. No. 09/572,953, mailed Jul. 7, 2008, Office Action.

U.S. Appl. No. 09/572,953, mailed Jan. 29, 2009, Notice of Allowance.

U.S. Appl. No. 09/597,784, mailed Oct. 3, 2003, Office Action.

U.S. Appl. No. 09/597,784, mailed Apr. 9, 2004, Office Action.

U.S. Appl. No. 09/597,784, mailed Oct. 19, 2004, Office Action.

U.S. Appl. No. 09/597,784, mailed May 5, 2005, Office Action.

U.S. Appl. No. 09/597,784, mailed Jan. 23, 2006, Office Action.

U.S. Appl. No. 09/597,784, mailed Jun. 26, 2006, Office Action.

U.S. Appl. No. 09/597,784, mailed Dec. 10, 2007, Notice of Allowance.

U.S. Appl. No. 09/597,784, mailed Feb. 4, 2010, Notice of Allowance.

U.S. Appl. No. 12/110,996, mailed Jun. 23, 2010, Office Action.

U.S. Appl. No. 12/110,996, mailed Jan. 28, 2011, Notice of Allowance.

U.S. Appl. No. 12/477,368, mailed Sep. 3, 2010, Office Action.

U.S. Appl. No. 12/477,368, mailed Jan. 20, 2011, Office Action.

U.S. Appl. No. 12/477,368, mailed Apr. 28, 2011, Notice of Allowance.

U.S. Appl. No. 13/218,654, mailed Oct. 5, 2011, Office Action.

U.S. Appl. No. 13/218,654, mailed Apr. 2, 2012, Office Action.

U.S. Appl. No. 13/218,654, mailed Aug. 2, 2013, Office Action.

U.S. Appl. No. 13/619,477, mailed Jun. 19, 2013, Office Action.

U.S. Appl. No. 13/619,618, mailed Mar. 7, 2013, Office Action.

U.S. Appl. No. 13/619,618, mailed Aug. 27, 2013, Office Action.

U.S. Appl. No. 13/218,654, mailed Sep. 23, 2013, Office Action.

U.S. Appl. No. 13/619,477, mailed Sep. 20, 2013, Notice of Allowance.

* cited by examiner

DIRECT FILE TRANSFER BETWEEN SUBSCRIBERS OF A COMMUNICATIONS SYSTEMS

CROSS-REFERENCE TO RELATED APPLICATIONS

This application is a continuation application of U.S. application Ser. No. 12/110,996, filed on Apr. 28, 2008 now U.S. Pat. No. 7,958,243, (now allowed), which is a continuation application of U.S. application Ser. No. 09/597,784, filed on Jun. 19, 2000, (now U.S. Pat. No. 7,366,779). The disclosures of the above referenced applications are expressly incorporated herein.

TECHNICAL FIELD

The present invention relates generally to transferring files between subscribers of a communications system.

BACKGROUND

Online service providers are constantly offering new services and upgrading existing services to enhance their subscribers' online experience. Subscribers have virtually on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the worldwide network of computers that make up the online service.

America Online has provided subscribers with the ability to send and receive instant messages. Instant messages are private online conversations between two or more people who have subscribed to the instant messaging service and have installed the necessary software. Because such online conversations take place virtually in real time, instant messaging can provide immediate access to desired information. Instant messaging is becoming a preferred means of communicating among online subscribers.

SUMMARY

In one general aspect, a file is transferred from a first client associated with a first subscriber to a communications system to a second client associated with a second subscriber to the communications system by connecting from the first client to a communications system host; sending, through the communications system host, a request to the second client to establish a direct connection to the second client; when the second client accepts the request, establishing a direct connection to the second client that bypasses the communications system host; and transferring a file over the direct connection.

Implementations may include authenticating the request by the communications system host. The second client may accept the request based on indicated preferences of the second subscriber. The direct connection may be initiated by the second client. The direct connection may be established using an IP address of the second client. A graphical user interface may be displayed indicating that a direct connection to the second client is established. The communications system host may be an instant messaging host. The file may comprise a data file, a text file, a graphics file, an audio file, and/or a video file. The direct connection may be a socket connection.

In another general aspect, a file is transferred from a first client associated with a first subscriber to a communications system to a second client associated with a second subscriber to the communications system by connecting from the second client to a communications system host; receiving, through the communications system host, a request from the first client to establish a direct connection; accepting the request from the first client; establishing a direct connection to the first client that bypasses the communications system host; and receiving a file over the direct connection.

Implementations may include authenticating the request by the communications system host. The request may be accepted based on indicated preferences of the second subscriber. The second client may initiate the direct connection. The direct connection may be established by the first client using an IP address of the second client. A graphical user interface may be displayed indicating that a direct connection to the first client is established. The communications system host may be an instant messaging host. The file may be a data file, a text file, a graphics file, an audio file, and/or a video file. The second client may receive an indication that the first subscriber using the first client is composing a message and then may receive the message composed by the first subscriber from the first client. The direct connection may be a socket connection.

Aspects of the present invention may be implemented by an apparatus and/or by a computer program stored on a computer readable medium. The computer readable medium may comprise a disc, a client device, a host device, and/or a propagated signal.

In another general aspect, a first client associated with a first subscriber to a communications system communicates with a second client associated with a second subscriber to the communications system by connecting from the second client to a communications system host; establishing a direct connection to the client that bypasses the communications system host; receiving an indication that the first subscriber using the first client is composing a message; and receiving the message composed by the first subscriber from the first client.

The indication may be a text message and/or an icon. The communications system host may be an instant messaging host.

Other features and advantages will be apparent from the following description, including the drawings, and from the claims.

DESCRIPTION

For illustrative purposes, FIGS. 1-6 describe a communications system for implementing techniques for transferring files between subscribers of an instant messaging host complex. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
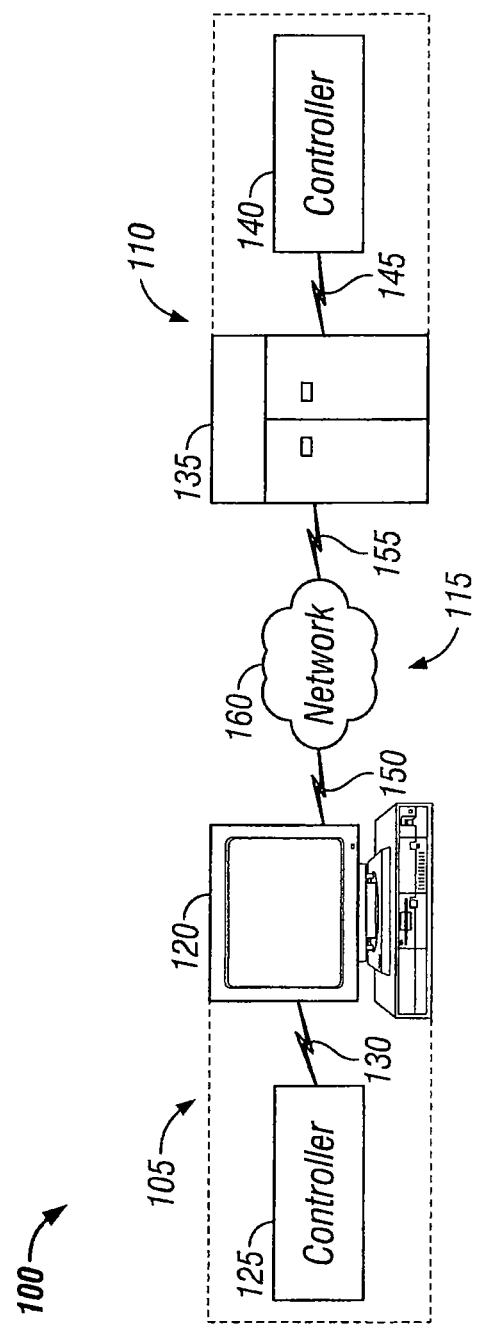
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
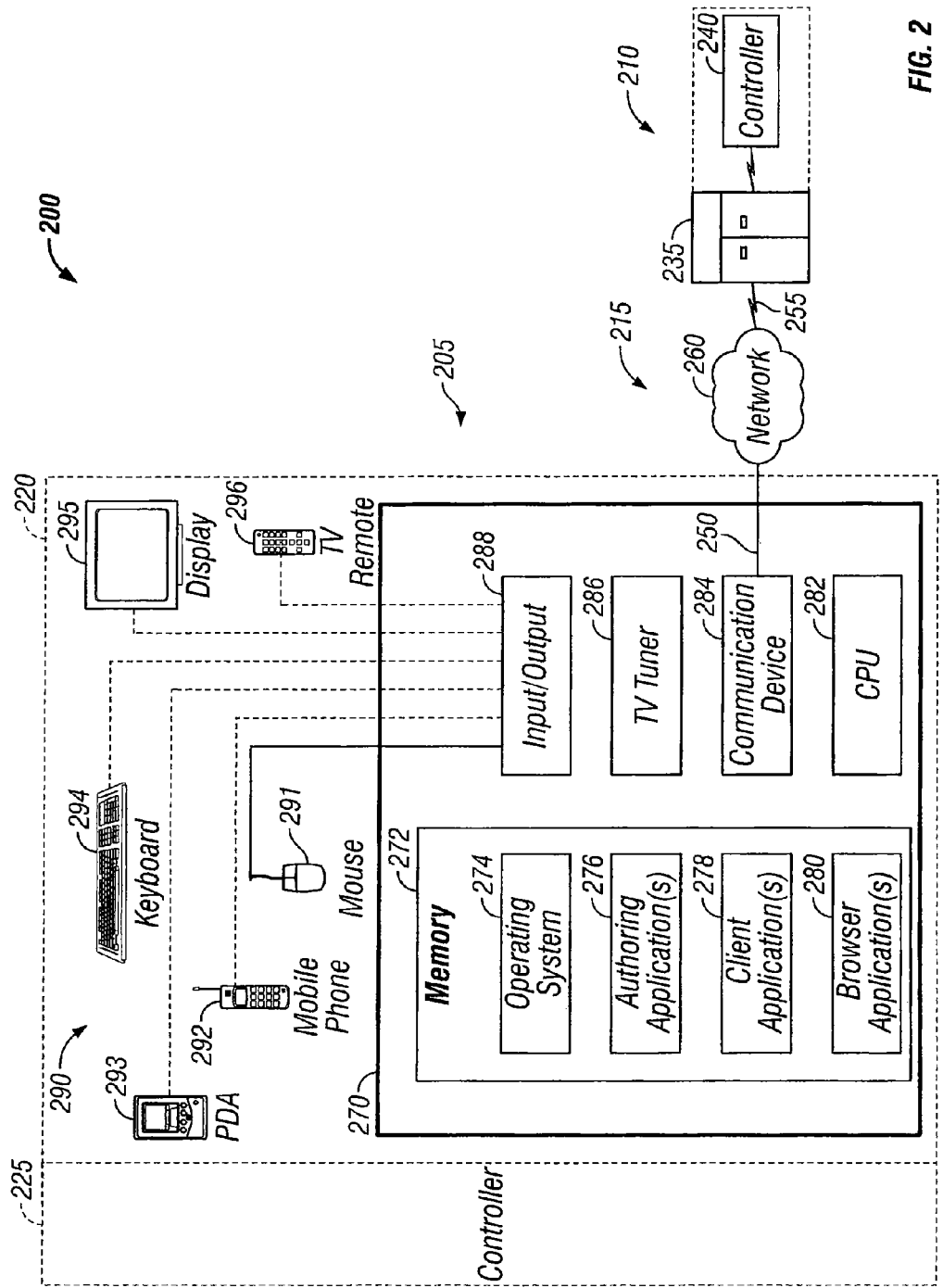
FIGS. 2-6 are expansions of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 252 of the general-purpose computer 250. In another implementation, the client controller 225 includes application programs externally stored in and performed by one or more device(s) external to the general- purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
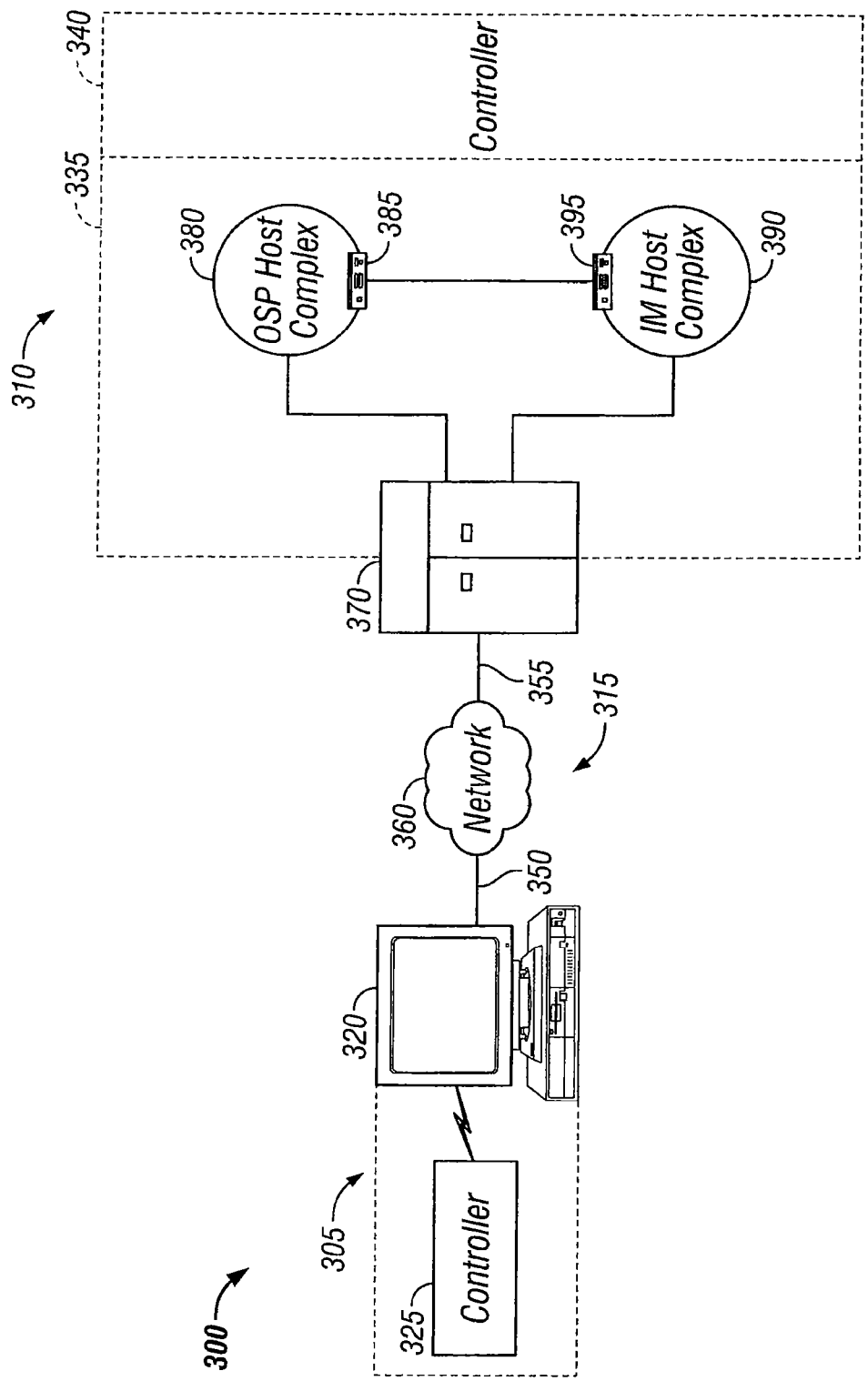

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 395 generally use different protocols such that transferring data between the complexes requires protocol conversion by or at the request of the OSP host complex gateway 385 and/or the IM host complex gateway 395.

Figure 4:
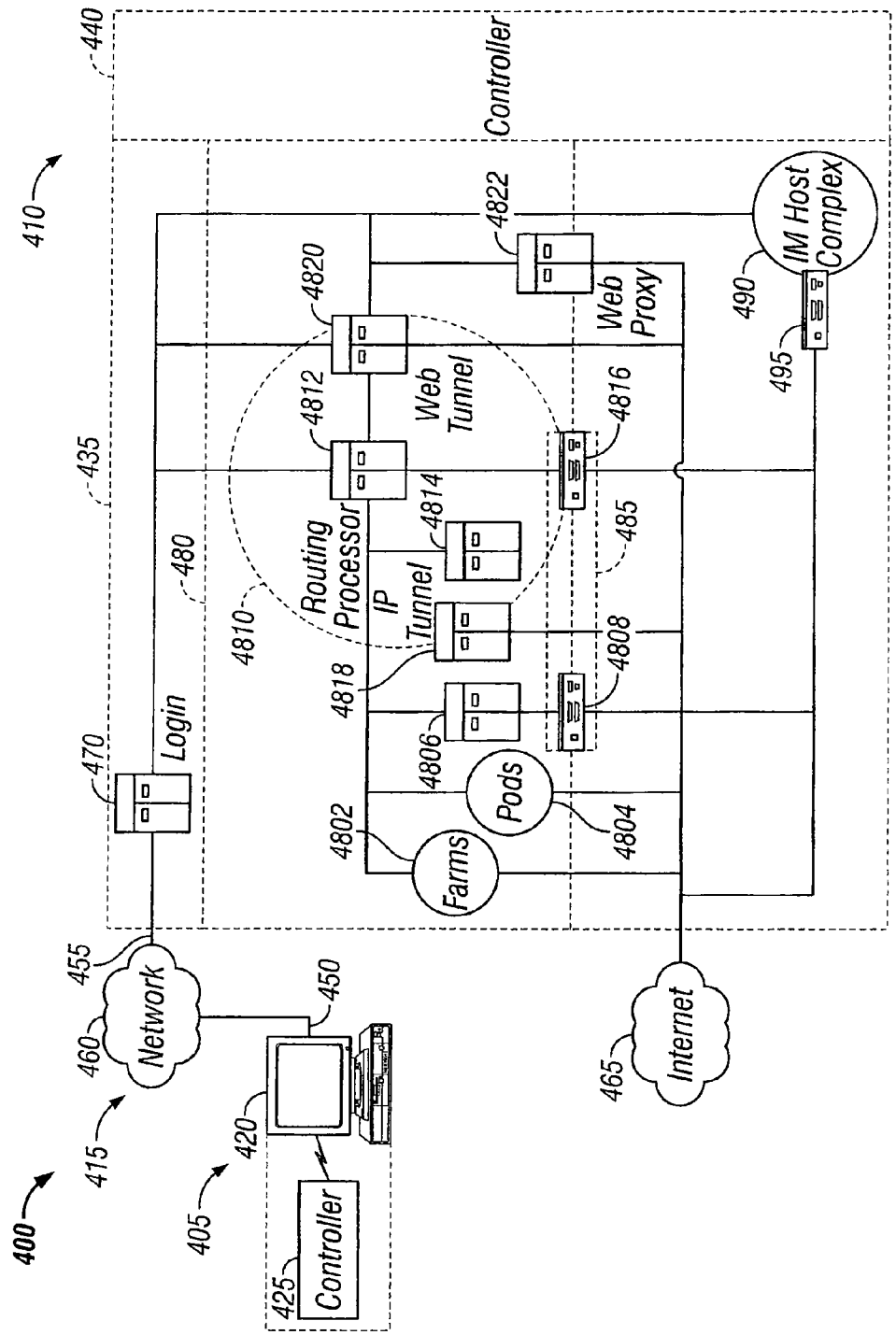

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 340 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Severs external to the OSP host complex 480 generally may be viewed as existing on the Internet 465. Servers internal to the OSP complex 480 may be arranged in one or more configurations. For example, servers may be arranged in large centralized clusters known as farms 4802 or in localized clusters known as pods 4804.

Farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480. To reduce the time delays and congestion inherent in centralized processing, some services offered by the OSP host complex 480 are provided from localized servers, generally known as pods 4804. Each pod 4804 includes one or more interrelated servers capable of operating together to provide one or more services offered by the OSP host complex 480 in a geographically localized manner, the servers within a pod 4804 generally operating independently rather than relying on resources external to the pod 4804 to operate. A pod 4804 may cache content received from external sources, such as farms 4802 or the Internet 465, making frequently requested information readily available to local subscribers served by the pod 4804. In this way, pods 4804 are particularly useful in providing services that are independent of other processes and servers such as, for example, routing, keywords, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded servers 4806. In general, the non-podded server 4806 may be dedicated to performing a particular service that relies on other processes and services for information and may be directly or indirectly connected to resources outside of the OSP host complex 480, such as the Internet 465 and the IM host complex 490, through an OSP gateway 4808. In the event that subscriber usage of the particular service is relatively high, the non-podded server 4806 may be included in a farm.

In the implementation of FIG. 4, a pod 4810, shown in more detail, includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4812 in the OSP host complex 480 or may direct the data request externally to the Internet 465 or the IM host complex 490 through an OSP/pod gateway 4816.

The routing processor 4812 also may direct data requests and/or otherwise facilitate communication between the client system 405 and the Internet 465. In one implementation, the client system 405 uses an OSP client application to convert standard Internet content and protocols into OSP protocols and vice versa. For example, when a browser application transmits a request in standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 402 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access the pod 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to a web tunnel 4820. The web tunnel 4820 may be a L2TP ("Layer Two Tunneling Protocol") tunnel capable of establishing a point-to-point protocol (PPP) session with the client system 405. The web tunnel 4820 provides a gateway to the routing processor 4812 within the pod 4810, the Internet 465, and a web proxy 4822.

The web proxy 4822 can look up subscriber information from the IP address of the client system 405 to determine the subscriber's parental controls settings and other demographic information. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
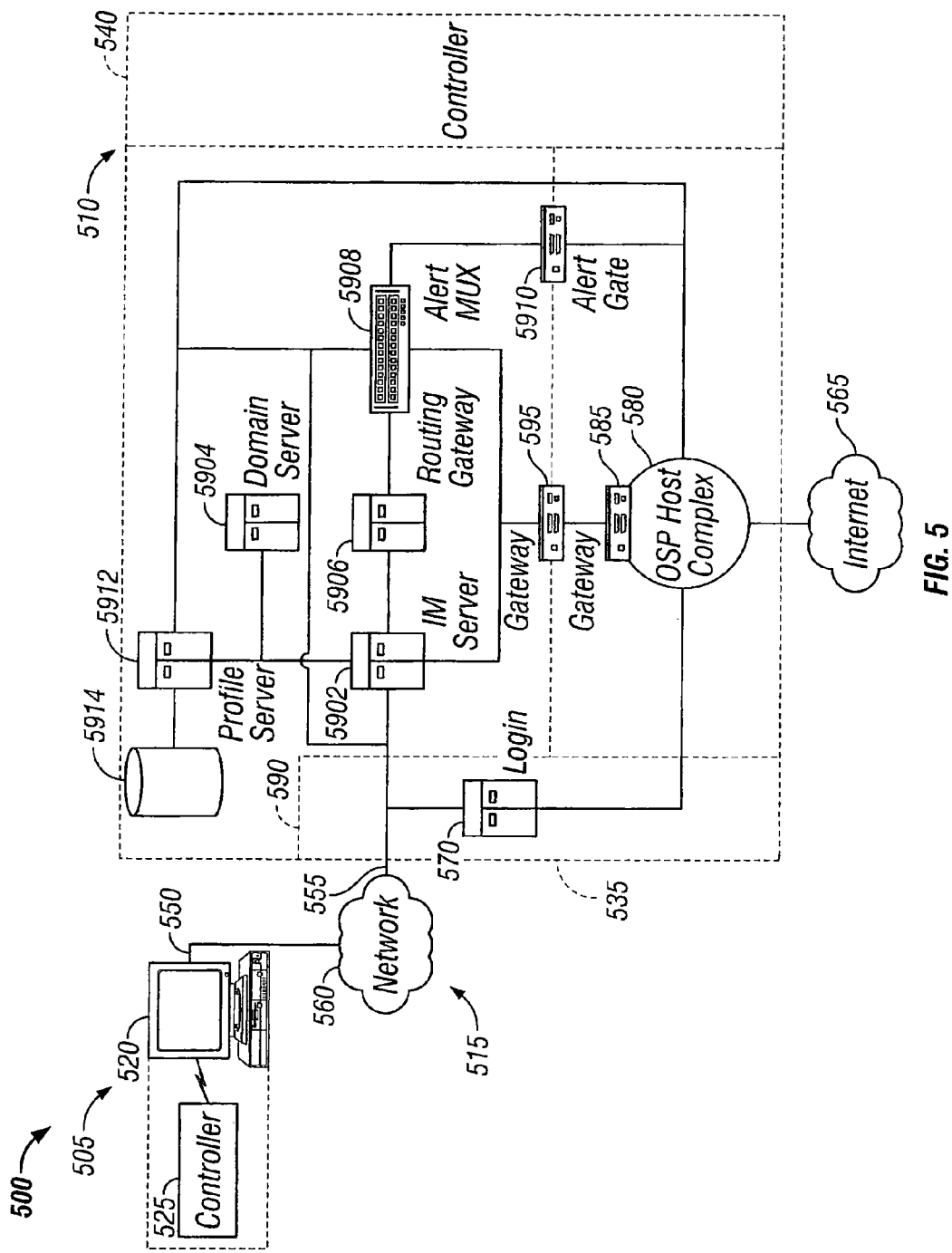

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain severs 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 530 also may communicate with other servers in the OSP host complex 590 to share subscriber profile data with other services. Alternatively, user profile data may be saved locally on the client device 505.

Figure 6:
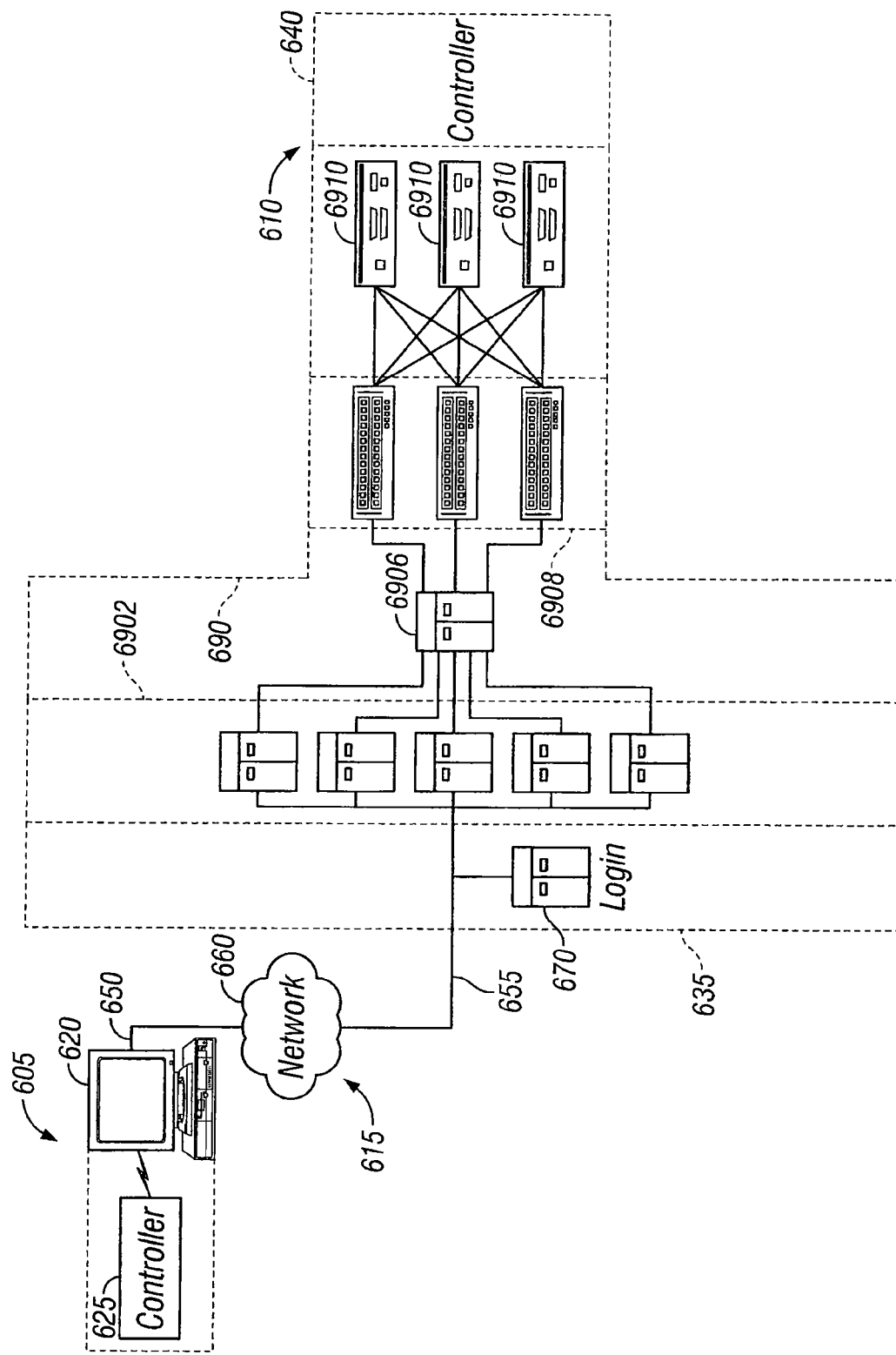

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 550, 555 enabling communications through the one or more delivery networks 660.

Examples of each element within the communication system of FIG. 5 are broadly described above with respect to FIGS. 1-5. In particular, the client system 605 and the communications link 615 typically have attributes comparable to those described with respect to client systems 105, 205, 305, 405 and 505 and communications links 115, 215, 315, 415 and 515 of FIGS. 1-5. Likewise, the host system 610 of FIG. 6 may have attributes comparable to and illustrates one possible embodiment of the host systems 110, 210, 310, 410 and 510 shown in FIGS. 1-5, respectively. However, FIG. 6 describes an aspect of the host system 610, focusing primarily on one particular implementation of IM host complex 690. For purposes of communicating with the IM host complex 690, the delivery network 660 is generally a telephone network.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 utilizing exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host system 610 includes a login server 670 capable of enabling communications with and authorizing access by client systems 605 to various elements of the host system 610, including the IM host complex 690. The IM host complex 690 includes an IM server network 6902 and an alert multiplexor network 6908. The IM server network 6902 is an interconnected network of IM servers and the alert multiplexor network 6908 is an interconnected network of alert multiplexors. Each IM server and each alert multiplexor can directly or indirectly communicate and exchange information with all of the IM servers in the IM server network 6902 and all of the alert multiplexors in the alert multiplexor network 6908. Each of the alert multiplexors in the alert multiplexor network 6908 is connected to several alert gates 6910 that receive different types of alerts. In the implementation of FIG. 6, the IM server network 6902 and the alert multiplexor network 6908 are interconnected by a routing gateway 6906 that serves as a common hub to reduce the number of connections.

A subscriber typically will be assigned to one IM server in the IM server network 6902 and to one alert multiplexor in the alert multiplexor network 6908 during a session based on one or more hashing techniques. However, the IM servers and the alert multiplexors are capable of storing subscriber information and other electronic content that may be accessed by the other IM servers and alert multiplexors. In one implementation, for example, each IM server in the IM server network 6902 may be dedicated to serving a particular set of registered subscribers. Because all of the IM servers can communicate with each other, all subscribers can communicate with each other through instant messaging. In another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Figure 7:
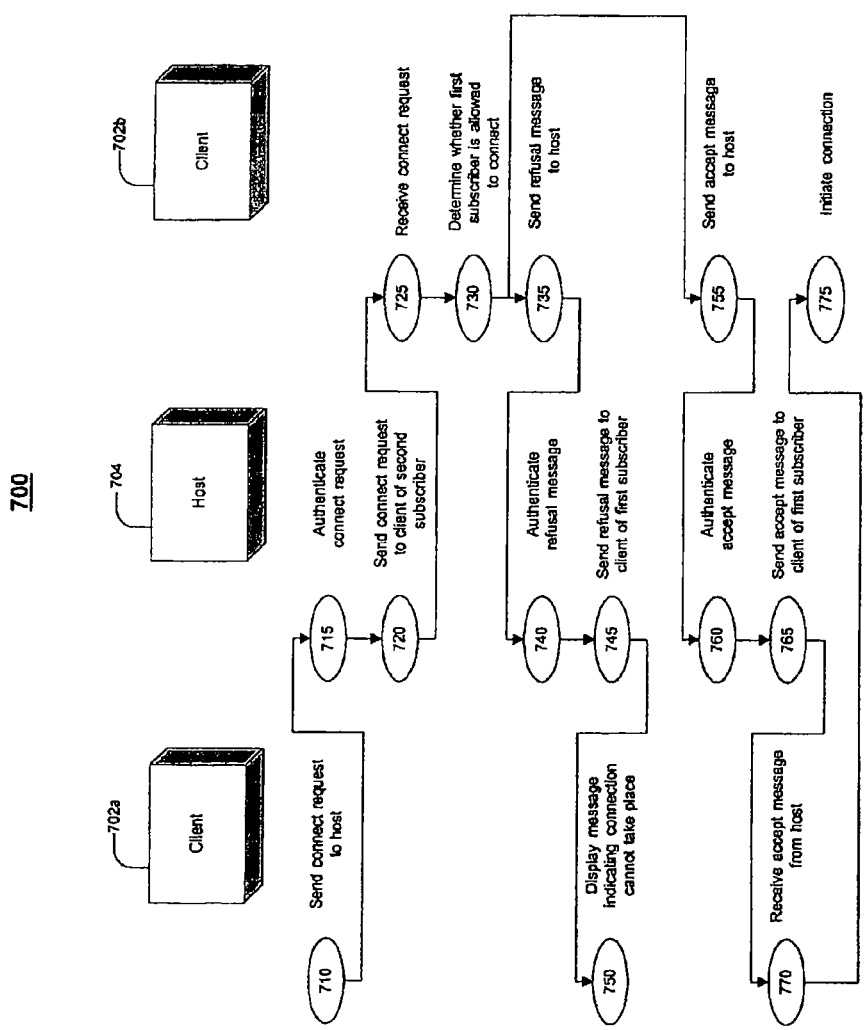
FIGS. 7-9 are flow charts of communications methods.

Referring to FIG. 7, a first client 702a, a second client 702b, and a host 704 interact according to a procedure 700 to transfer one or more files. The procedure 700 may be implemented by any suitable type of hardware, software, device, computer, computer system, equipment, component, program, application, code, storage medium, or propagated signal.

Examples of each element of FIG. 7 are broadly described above with respect to FIGS. 1-6. In particular, the first client 702a and the second client 702b typically have attributes comparable to those described with respect to client devices 120, 220, 320, 420, 520 and 620 and/or client controllers 125, 225, 325, 425, 525 and 625. The host 704 typically has attributes comparable to those described with respect to host device 135, 235, 335, 435, 535 and 635 and/or host controllers 140, 240, 340, 440, 540 and 640. The first client 702a, the second client 702b, and/or the host 704 may be directly or indirectly interconnected through a known or described delivery network.

Each of the clients 702a, 702b is associated with a subscriber. To allow file transfers, each subscriber sets certain preferences for permitting files to be transferred to and from other subscribers. For example, a first subscriber may set transfer preferences governing which screen names or subscribers can send files to client 702a. Likewise, a second subscriber may set transfer preferences governing which screen names or subscribers and can send files to client 702b. Typically, each subscriber will be presented with a graphical UI ("User Interface") that permits the subscriber to select among various transfer preferences. A subscriber's transfer preferences may be maintained locally or on the host 704.

In general, the client 702a and the client 702b communicate over an open connection, such as an open TCP connection established through the host 704. Typically, both clients 702a, 702b include a Winsock API for establishing an open TCP connection to the host 704 and a client application for accessing the host 704. The client devices 702a, 702b connect to the host 704 to establish the connection.

The clients 702a, 702b can use the connection to communicate with the host 704 and with each other. The connection remains open during the time that the first client 702a and the second client 702b are accessing the host 704. To access the host 704, each client 702a, 702b sends a request to the host 704. The requests identify the associated subscribers to the host 704 and to other subscribers using the subscribers' unique screen names. The host 704 verifies a subscriber's information (e.g., screen name and password) against data stored in a subscriber database. If the subscriber's information is verified, the host 704 authorizes access. If the subscriber's information is not verified, the host 704 denies access and sends an error message.

Upon accessing the host 704, the client 702a receives a list of the first subscriber's "buddies" that are currently online (i.e., accessing the host 704). Buddies are subscribers or screen names designated for exchanging instant messages. In general, the host 704 informs the first subscriber as to whether designated buddies are online or offline. The host 704 also informs any subscriber that has designated the first subscriber as a buddy that the first subscriber is online. The first subscriber can use an application running on the client 702a ("the client application") to view the online status of particular buddies, exchange instant messages with online buddies, participate in group chat rooms, trade files such as pictures, invitations or documents, find other subscribers with similar interests, get customized news and stock quotes, and search the Web. Additionally, the subscriber can use the client application to transfer one or more files to or from the client device of another subscriber.

In one implementation, the first subscriber using the client 702a selects to transfer one or more files to the client 702b of the second subscriber. The first subscriber initiates the transfer by sending a connect request to the host 704 (step 710). The connect request includes, for example, the message type, the screen name of the first subscriber, the screen name of the second subscriber, the IP address of the client 702a, and a randomly generated security number. The host 704 authenticates that the connect request from the client 702a is from a valid subscriber using, for example, a reverse look-up table (step 715). Once the connect request is verified, the host 704 sends the connect request to the client 702b of the second subscriber (step 720).

The client 702b receives the connect request from the host 704 (step 725) and then determines whether the first subscriber (i.e., the sender of the connect request) is allowed to connect (step 730). The client 702b then sends a message to the host 704 based on whether the second subscriber has selected to give the first subscriber permission to connect. In the event that the first subscriber is not permitted to connect, the client 702b sends a refusal message to the host 704 (step 735). The host 704 authenticates that the refusal message from the client 702b is from a valid subscriber (step 740) and then sends the refusal message to the client 702a of the first subscriber (step 745). Upon receiving the refusal message, the client 702a displays a message to the first subscriber indicating that the connection cannot take place (step 750).

In the event that the first subscriber is permitted to connect, the client 702b sends an accept message to the host 704 (step 755). The host 704 authenticates that the accept file message from the client 702b is from a valid subscriber (step 760) and then sends the accept message to the client 702a of the first subscriber (step 765). The client 702a receives the accept message from the host 704 (step 770), and then the client 702b initiates the connection (step 775).

Figure 8:
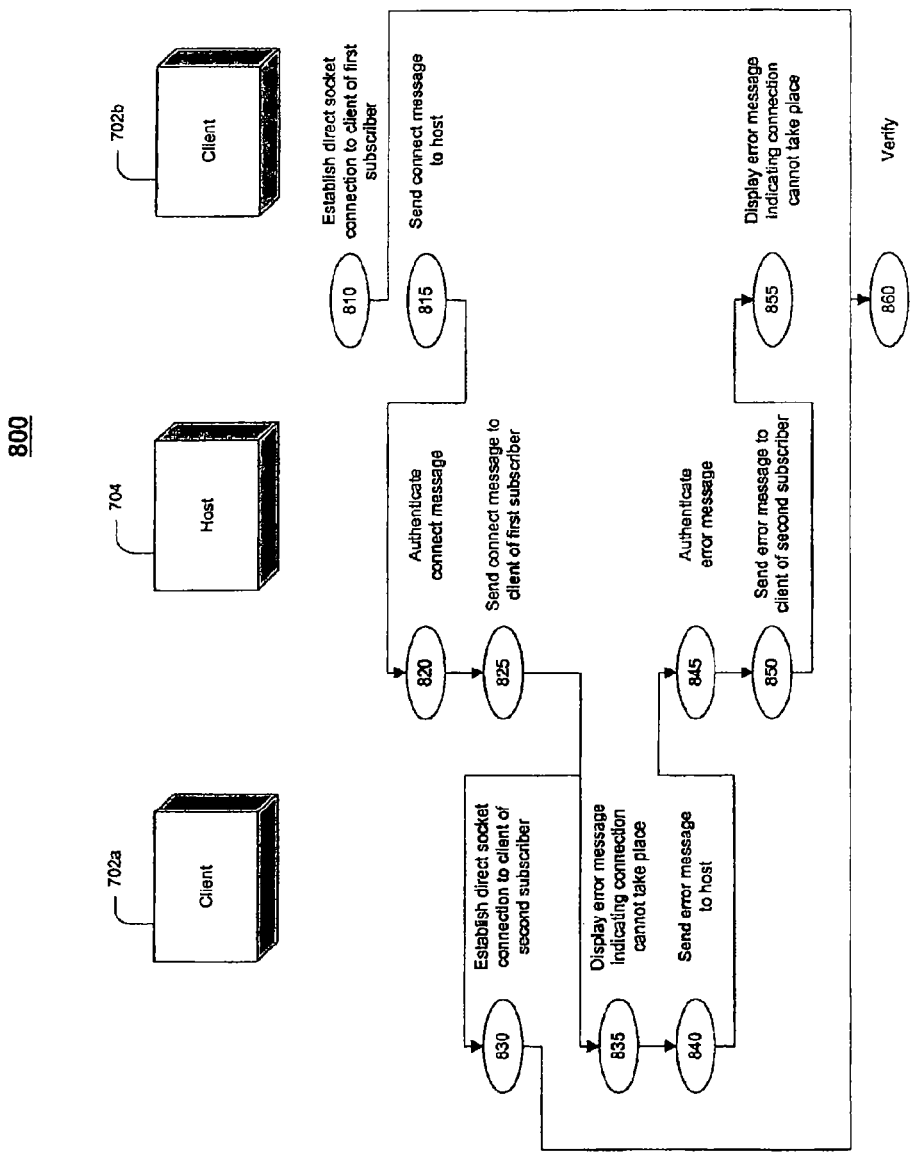

Referring to FIG. 8, the first client 702a, the second client 702b, and the host 704 interact according to a procedure 800 to initiate the connection (step 775 of FIG. 7). The procedure 800 may be implemented by any suitable type of hardware, software, device, computer, computer system, equipment, component, program, application, code, storage medium, or propagated signal.

In one implementation, the client 702b attempts to establish a direct socket connection (e.g., a peer-to-peer socket connection) to the client 702a using the IP address of the client 702a (step 810). In some circumstances, however, the client 702b may be unable to establish a direct socket connection to the client 702a, such as, for example, when the client 702a is behind a firewall. In the event that the client 702b cannot establish a direct socket connection to the client 702a after a predetermined time period, the client 702b sends a connect message to the client 702a through the host 704 (step 815). The connect message includes, for example, the message type, the screen name of the first subscriber, the screen name of the second subscriber, the IP address of the client 702b, and a randomly generated security number. The host 704 authenticates that the connect message from the client 702b is from a valid subscriber (step 820) and then sends the connect message to the client 702a (step 825).

Upon receiving the connect message, the client 702a attempts to establish a direct socket connection to the client 702b of the second subscriber using the IP address of the client 702b (step 830). If, however, the client 702a is unable to establish a direct socket connection to the client 702b, such as, for example, when the client 702b is behind a firewall, the client 702a displays a message indicating that the file transfer cannot take place (step 835) and sends an error message to the client 702b through the host 704 (step 840). The host 704 authenticates that the error message from the client 702a is from a valid subscriber (step 845) and then sends the error message to the client 702b of the second subscriber (step 850). In response to the received error message, the client 702b displays a message indicating that the file transfer cannot take place (step 855).

Figure 9:
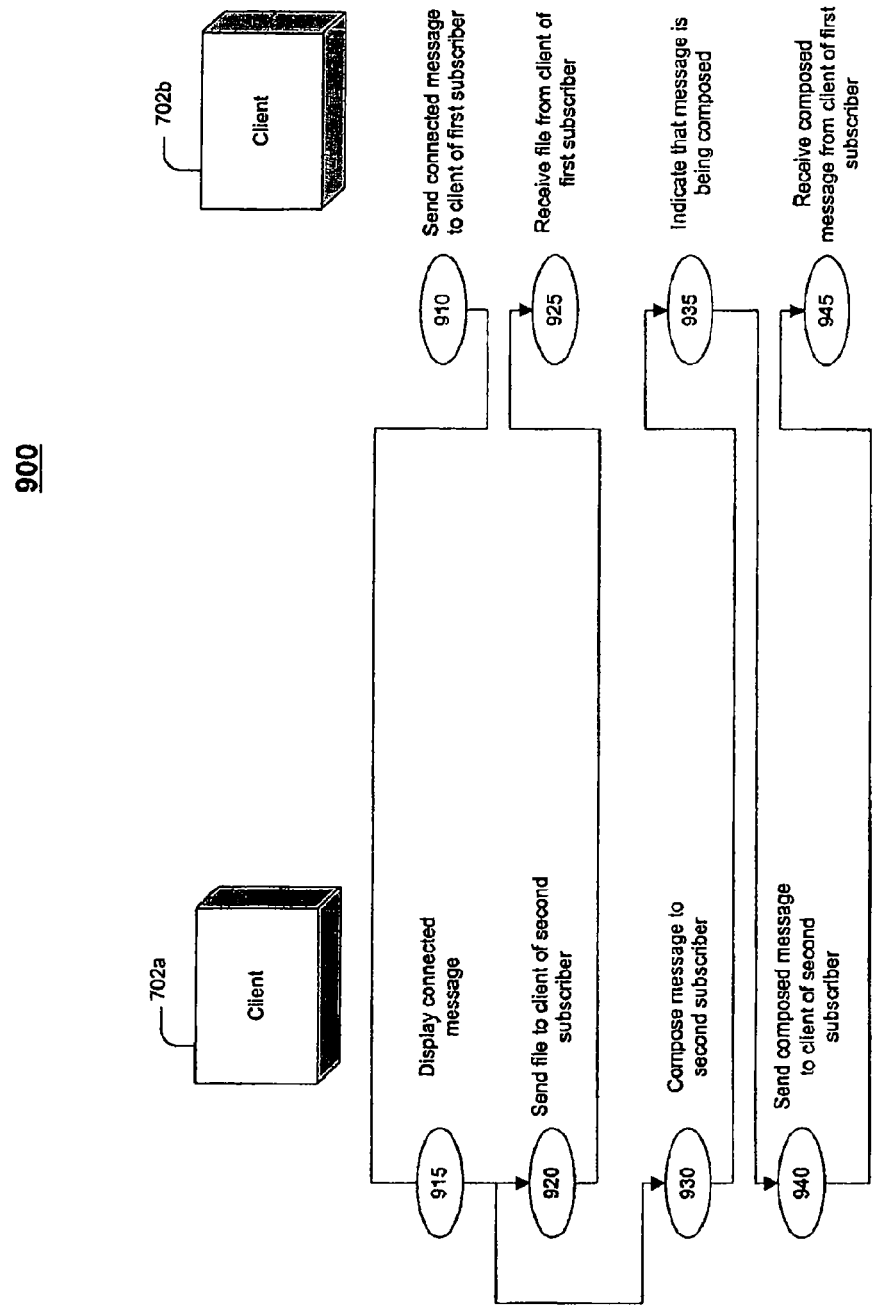

If a direct socket connection has been established between the client 702a and the client 702b (in either step 810 or step 830), the client 702b verifies that the client 702a includes a valid client application by, for example, verifying the security number of the client application (step 860). File transfer then proceeds according to the procedure 900 illustrated in FIG. 9. The procedure 900 may be implemented by any type of hardware, software, device, computer, computer system, equipment, component, program, application, code, storage medium, or propagated signal.

The direct connection bypasses the connection between the client 702a and the host 704. In one implementation, the host 704 limits the capacity of the connection to the client 702a. As a result, the client 702a cannot transfer files larger than a threshold file size (e.g. 8000 characters) through the host 704. In contrast to the capacity of the connection between the client 702a and the host 704, the capacity of the direct socket connection between the client 702a and the client 702b is not limited. The client 702a, therefore, may transfer relatively large files (e.g. graphics files, executable files) to the client 702b.

After the connection is established, the client 702b sends a connected message to the client 702a of the first subscriber (step 910). The connected message includes, for example, text indicating that the second subscriber is directly connected. The client 702a receives the connected message and then displays the connected message to the first subscriber (step 915).

After being notified that a direct connection has been established, the first subscriber may select and send a file to the client 702b of the second subscriber (step 920). The file may be selected from any directory on the client 702a or from any other storage location. The file may be any collection of data stored in any type of format. Examples include, but are not limited to, data files, text files, graphics files, audio files, and video files. The client 702b receives the file from the client 702a over the direct connection (step 925). Using the client 702b, the second subscriber may open, execute, and/or save the file. In one implementation, the file being transferred is opened, executed and/or otherwise displayed to the second subscriber in an instant messaging window.

After being notified that a direct connection is established, the first subscriber also may use the client 702a to compose a message to the second subscriber (step 930). As the first subscriber composes the message, the client 702b indicates to the second subscriber that a message is being composed (step 935). Because the second subscriber knows that the first subscriber is composing a message, the second subscriber will be less likely to interrupt the first subscriber. This will facilitate exchanges between subscribers and allow conversational communication.

After the first subscriber has composed a message, the first subscriber sends the composed message to the client 702b of the second subscriber (step 940). Using the client 702b, the second subscriber receives the composed message from the client 702a over the direct connection (step 945).

FIGS. 10-16 illustrate examples of graphical user interfaces ("UIs") that may be presented to subscribers. In general, a graphical UI will be rendered on a subscriber's client device.

Figure 10:
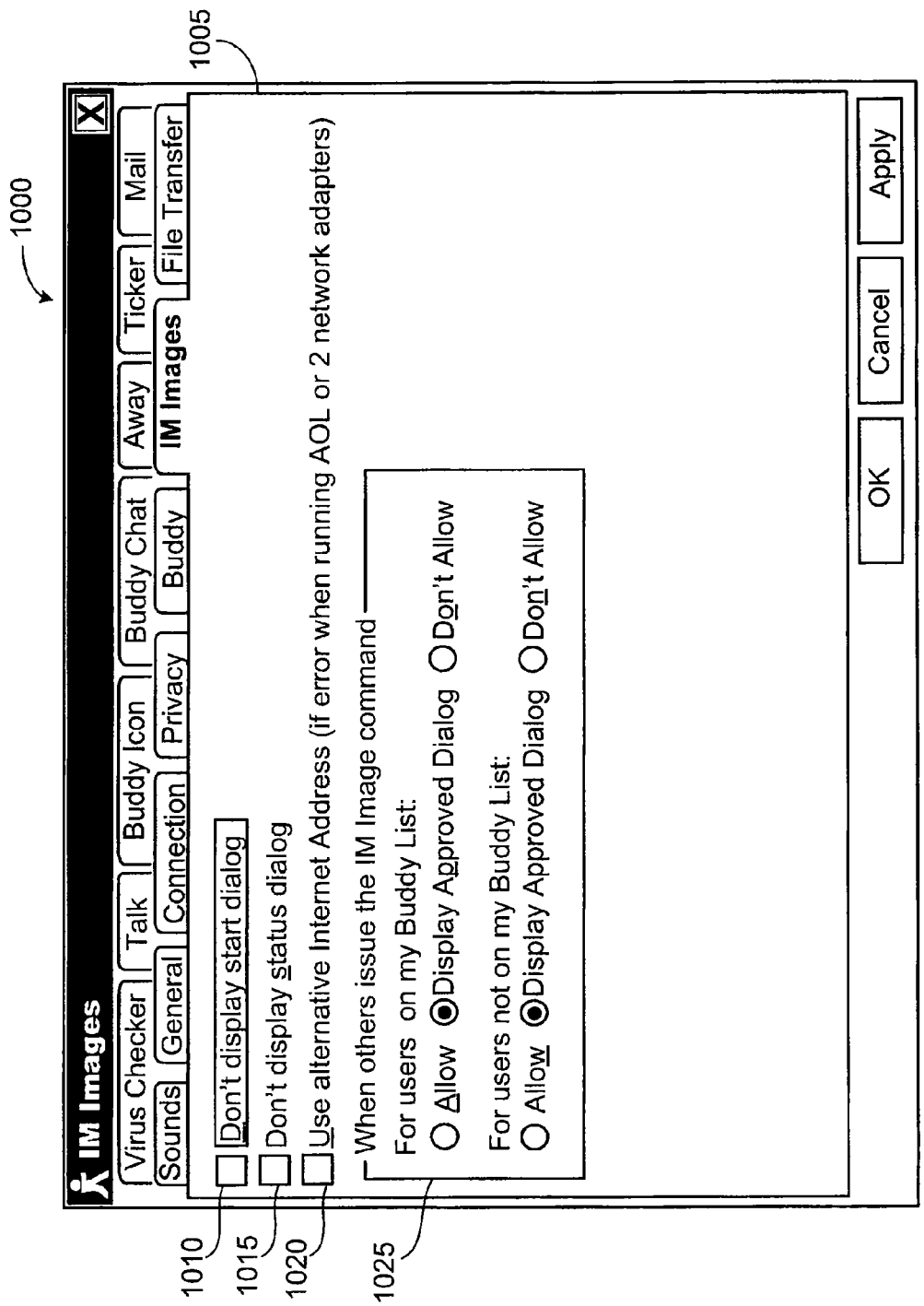
FIGS. 10-16 are illustrations of different graphical user interfaces.

Referring to FIG. 10, a UI 1000 includes one implementation of a preference box 1005 for allowing a subscriber to set certain preferences for transferring files. The preference box 1005 includes a "Don't Display Start" dialogue box 1010 to stop the start dialogue box (see FIG. 12) from appearing. The preference box 1005 also includes a "Don't Display Status" dialogue box 1015 to stop the status dialogue box from appearing. In general, the instant messaging service will display the status of a file transfer by default. The preference box 1005 includes a "Use Alternate Internet Address" box 1120 to let the host use another internet address if there is a connection error when running the operating system software or using two network adapters.

The preference box 1005 also includes a field 1025 for setting certain preferences when others issue a direct transfer command. For users on the subscriber's buddy list, the subscriber can select to allow the users on the buddy list to directly transfer files; to cause the client to display a dialog box allowing the subscriber to accept or reject files; or to specify that users in the buddy list cannot directly transfer files. For users who are not in the subscriber's buddy list, the subscriber can select to allow the users to directly transfer files; to cause the client to display a dialog box allowing the subscriber to accept or reject files; or to specify that users not in the buddy list cannot directly transfer files.

Figure 11:
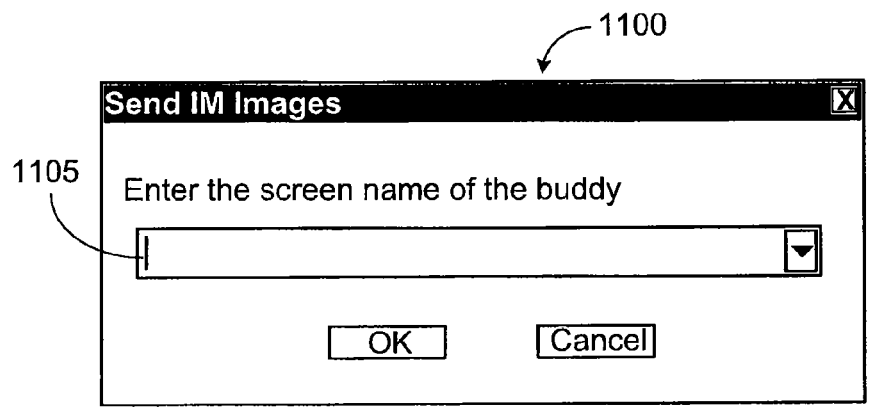

Referring to FIG. 11, a UI 1100 includes a screen name box 1105 for allowing the subscriber to designate the screen name of a subscriber to whom a file is to be transferred. In one example, the UI 1100 is presented to the first subscriber. In order to directly connect to the client of the second subscriber, the first subscriber enters the screen name of the second subscriber into the screen name box 1105. Alternatively, if the second subscriber is on the first subscriber's buddy list, the first subscriber can open an instant message to the second subscriber and click on a direct transfer icon.

Figure 12:
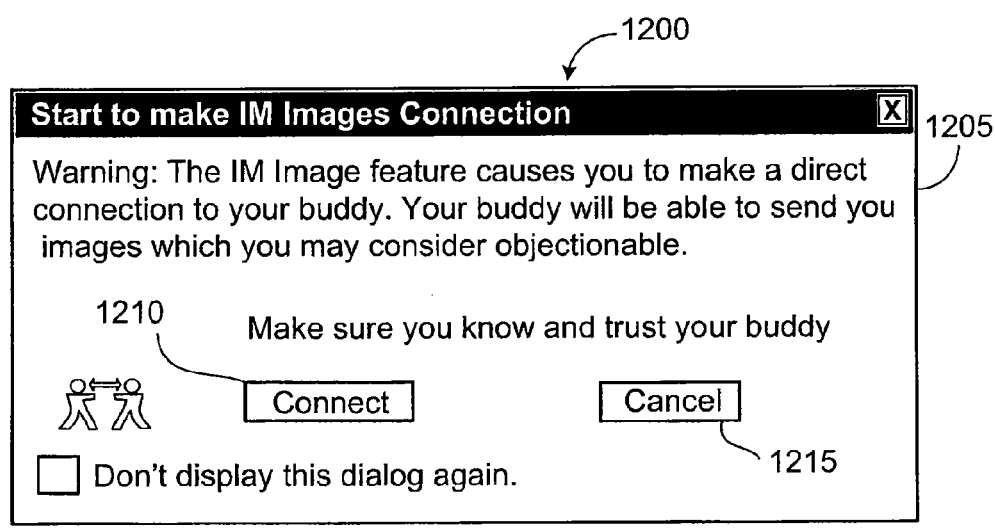

Referring to FIG. 12, a UI 1200 includes a start dialog box 1200 displaying a warning to the sending subscriber. The warning indicates that objectionable files may be transferred over the direct connection. The start dialog box 1205 includes a "Connect" button 1210 to proceed with the direct connection and a "Cancel" button 1215 to abort the direct connection.

Figure 13:
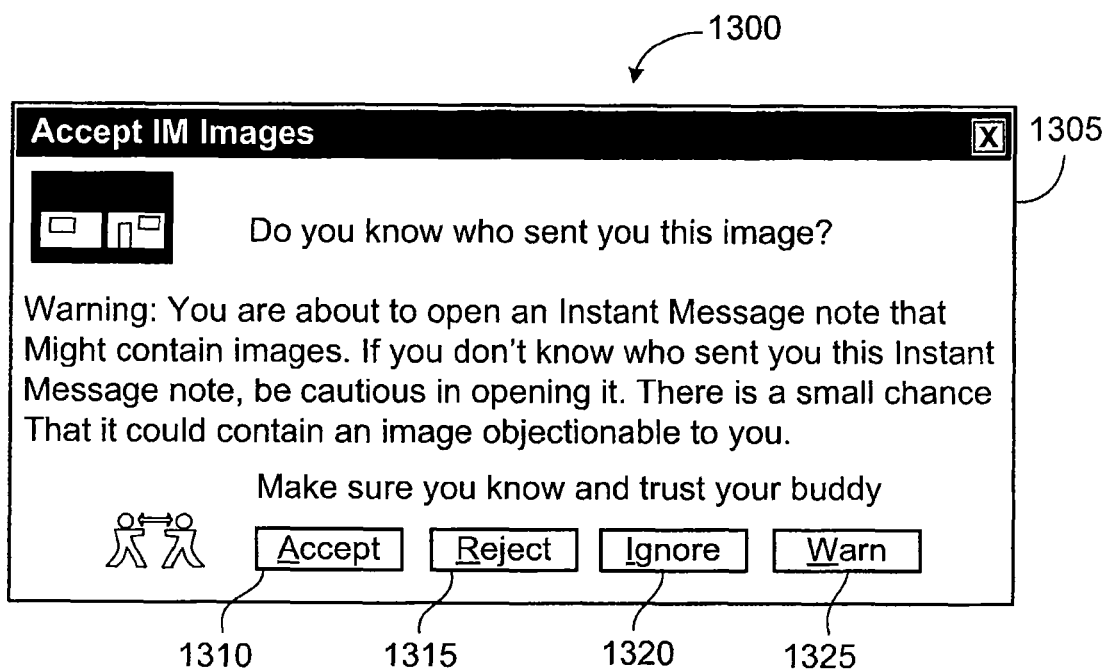

Referring to FIG. 13, a UI 1300 includes an "Accept" dialog box 1305 displaying a warning to the receiving subscriber. The warning cautions the receiving subscriber to recognize the sending subscriber. The accept dialog box 1305 includes an "Accept" button 1310 to accept the direct connection, a "Reject" button 1315 to reject the direct connection, an "Ignore" button 1320 to ignore the request to directly connect, and a "Warn" button 1325 to warn the sending subscriber not to attempt further direct connections.

Figure 14:
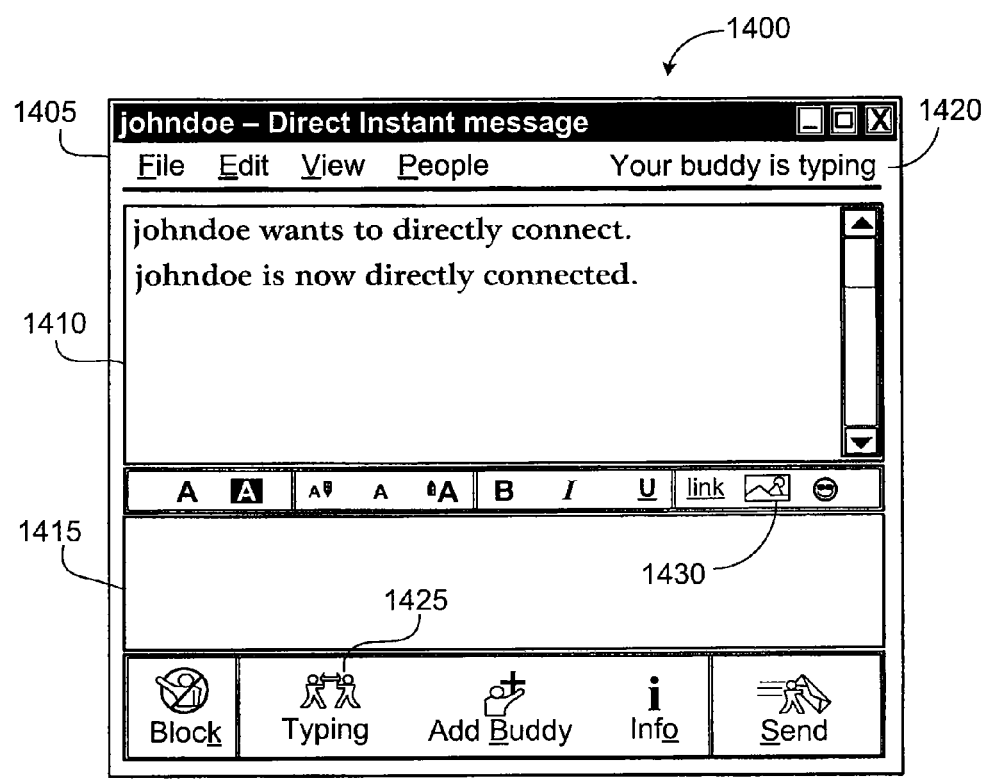

Referring to FIG. 14, a UI 1400 includes a direct instant message box 1405 presented to the receiving subscriber after the request to directly connect is accepted. The direct instant message box 1405 includes a reading field 1410 for reading instant messages and a writing field 1415 for composing instant messages. The direct instant message box 1405 also includes a typing message 1420 and a typing icon 1425 indicating that the sending subscriber is composing a message. The direct instant message box 1405 also includes an insert file icon 1430.

Figure 15:
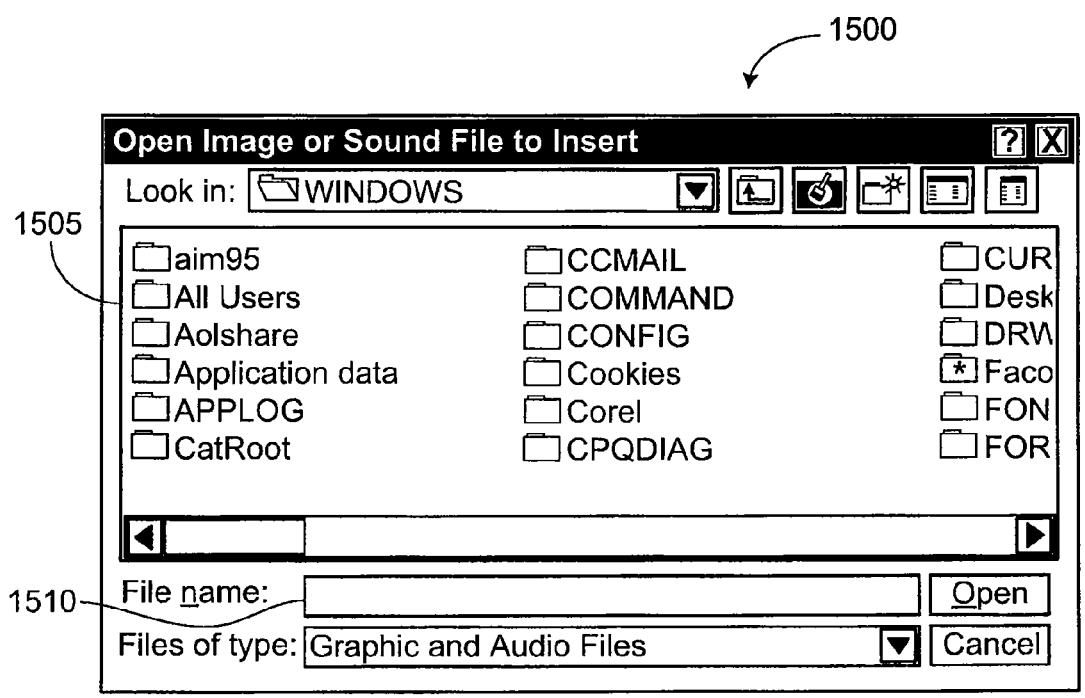

Referring to FIG. 15, a UI 1500 is displayed when the subscriber selects to insert a file into a direct instant message. The UI 1500 displays a listing of directories 1505 from which to select a stored file. The UI 1500 also includes a file name box 1510 for entering the name of a selected file.

Figure 16:
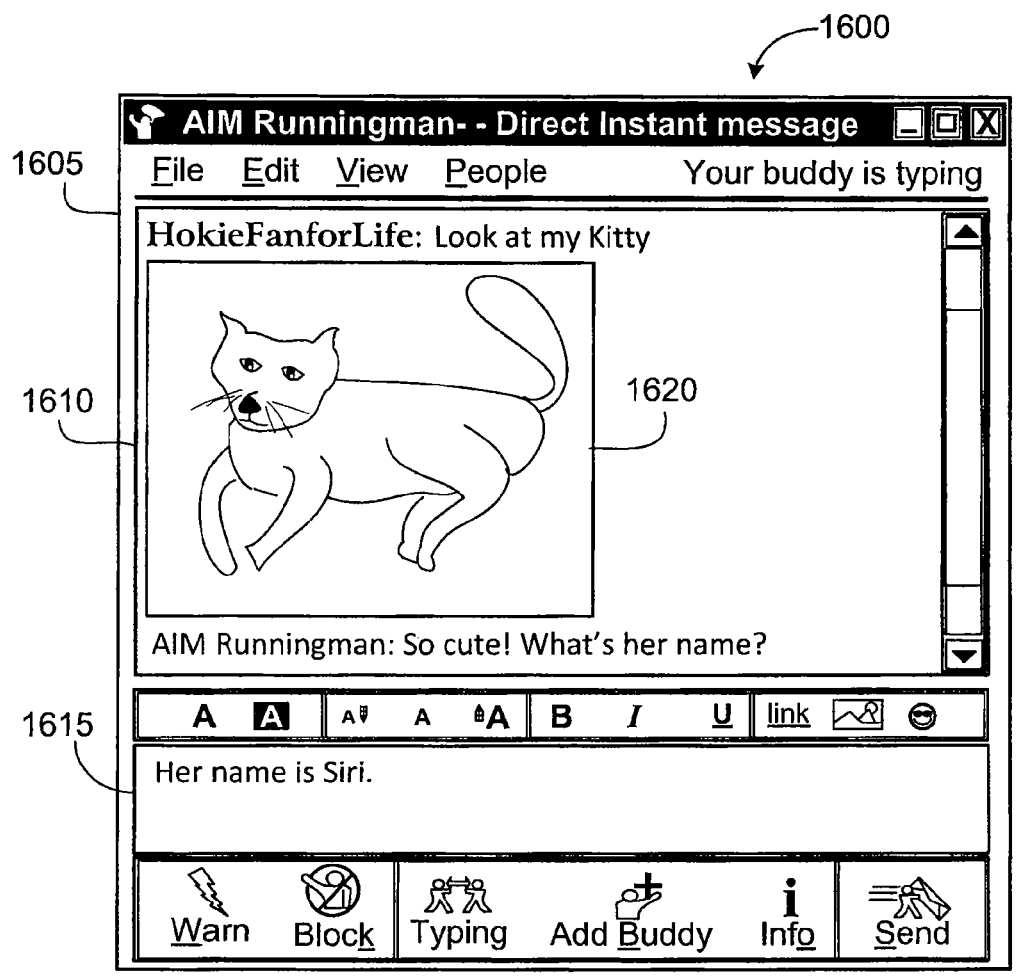

Referring to FIG. 16, a UI 1600 includes a direct instant message box 1605. The direct instant message box 1605 includes a reading field 1610 and a writing field 1615. The reading field 1610 includes an image 1620. In this example, a graphics file selected to be transferred is opened (i.e., displayed) in the direct instant message box 1605.

Other embodiments are within the scope of the following claims.

What is claimed is:

1. A method comprising:
    accessing a contact list associated with a first user;
    determining, using at least one processor, that a second user identified in the contact list is online based on a second client associated with the second user being connected to a host system;
    establishing a host-based connection between a first client associated with the first user and the second client associated with the second user, wherein the host-based connection comprises a first connection between the first client and the host system and a second connection between the second client and the host system; and
    enabling, while the host-based connection is active, a direct electronic connection between the first client associated with the first user and second client associated with the second user, wherein the direct electronic connection between the first client and the second client is independent from the host-based connection and allows the transfer of digital communications between the first client and the second client.

2. The method of claim 1, wherein the direct electronic connection is a direct socket connection.

3. The method of claim 1, wherein the direct electronic connection is a peer-to-peer connection.

4. The method of claim 1, wherein the direct electronic connection for transferring digital communications is not limited to sending digital communications of particular sizes.

5. The method of claim 1, wherein the direct electronic connection is established based on a connect request sent from the first client to the second client.

6. The method of claim 5, wherein the connect request is sent from the first client to the second client through the host-based connection.

7. The method of claim 1, wherein the digital communications between the first client and the second client comprise at least one instant message.

8. The method of claim 1, further comprising: indicating to the second user that the first user is composing the at least one instant message.

9. The method of claim 1, wherein the digital communications comprise at least one file.

10. A system, comprising:
    at least one processor; and
    at least one non-transitory computer readable storage medium storing instructions thereon that, when executed by the at least one processor, cause the system to:
    access a contact list associated with a first user;
    determine, using at least one processor, that a second user identified in the contact list is online based on a second client associated with the second user being connected to a host system;
    establish a host-based connection between the first client associated with the first user and the second client associated with the second user, wherein the host-based connection comprises a first connection between the first client and the host system and a second connection between the second client and the host system ; and
    enable, while the host-based connection is active, a direct electronic connection between the first client associated with the first user and second client associated with the second user, wherein the direct electronic connection between the first client and the second client is independent from the host-based connection and allows for the transfer of digital communications between the first client and the second client.

11. The system of claim 10, wherein the direct electronic connection is a direct socket connection.

12. The system of claim 10, wherein the direct electronic socket connection is a peer-to-peer connection.

13. The system of claim 10, wherein the direct electronic connection for transferring digital communications is not limited to sending digital communications of particular sizes.

14. The system of claim 10, wherein the direct electronic connection is established based on a connect request sent from the first client to the second client.

15. The system of claim 14, wherein the connect request is sent from the first client to the second client through the host-based connection.

16. The system of claim 10, wherein the digital communications comprise at least one instant message.

17. The system of claim 16, wherein the instructions, when executed by the at least one processor, further cause the system to: indicate to the second user that the first user is composing the at least one instant message.

18. The system of claim 10, wherein the digital communications comprise at least one file.

19. A non-transitory computer-readable medium including instructions for performing, when executed by a processor, a method comprising:
- accessing a contact list associated with a first user;
- determining, using at least one processor, that a second user identified in the contact list is online based on a second client associated with the second user being connected to a host system;
- establishing a host-based connection between the first client associated with the first user and the second client associated with the second user, wherein the host-based connection comprises a first connection between the first client and the host system and a second connection between the second client and the host system; and
- enable, while the host-based connection is active, a direct electronic connection between the first client associated with the first user and second client associated with the second user, wherein the direct electronic connection between the first client and the second client is independent from the host-based connection and allows for the transfer of digital communications between the first client and the second client.

20. The computer-readable medium of claim 19, wherein the direct electronic connection is a direct socket connection.

21. The computer-readable medium of claim 19, wherein the direct electronic socket connection is a peer-to-peer connection.

22. The computer-readable medium of claim 19, wherein the direct electronic connection for transferring digital communications is not limited to sending digital communications of particular sizes.

23. The computer-readable medium of claim 19, wherein the direct electronic connection is established based on a connect request sent from the first client to the second client.

24. The computer-readable medium of claim 23, wherein the connect request is sent from the first client to the second client through the host-based connection.

25. The computer-readable medium of claim 19, wherein the digital communications comprise at least one instant message.

26. The computer-readable medium of claim 25, further comprising instructions for indicating to the second user that the first user is composing the at least one instant message prior to transferring the at least one instant message from the first client to the second client.

27. The computer-readable medium of claim 19, wherein the digital communications comprise at least one file.

* * * * *